INVENTORS
RICHARD P. HEINTZ
ROBERT D. VANDERLAAN
ATTORNEY

3,384,118
FUEL CONTROL VALVE
Richard P. Heintz and Robert D. Vanderlaan, Kalamazoo, Mich., assignors to Pneumo Dynamics Corporation, Cleveland, Ohio
Filed Oct. 23, 1965, Ser. No. 503,490
21 Claims. (Cl. 137—625.21)

The present invention relates as indicated to a fuel control valve and more particularly to a fuel control valve particularly adapted for use in fuel injection systems.

Fuel control valves of the type here concerned, as well known by those skilled in the art, function to sequentially supply fuel at relatively high pressures to a series of fuel injector valves, with the control valve simultaneously functioning to sequentially cut off and re-apply pressure to each of such injector valves in order, thereby to initiate and terminate the fuel injection period.

Present fuel control valves of the described type have proved less than completely satisfactory for a number of reasons. Initially, present valve constructions are characterized by the presence of numerous parts which require lapped or matched fittings thereby increasing machining and ultimate valve costs. Present such valves are further characterized by excessive leakage at the relatively high pressures of operation, which pressures are in the range of 20,000 pounds per square inch or above. Further, present valve constructions are notably deficient in the provision of precisely accurately and conveniently accessible means for varying the timing and duration of the injection period.

With the above in mind, a primary object of the present invention is to provide an improved fuel control valve in which the number of valve components requiring lapped or precisely machined surfaces is minimized thereby permitting valve manufacture at relatively low costs.

A further object of the present invention is to provide a fuel control valve uniquely constructed to reduce leakage of pressurized fuel.

A still further object of the present invention is to provide a fuel control valve in which the timing and the duration of the fuel injection periods for the several injector valves controlled by and communicating with the control valve can be accurately and simply adjusted by means conveniently accessible at the exterior of the control valve housing.

Another object of the invention is to provide a fuel control valve having minimum duration capabilities.

Other objects of the invention will become apparent as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
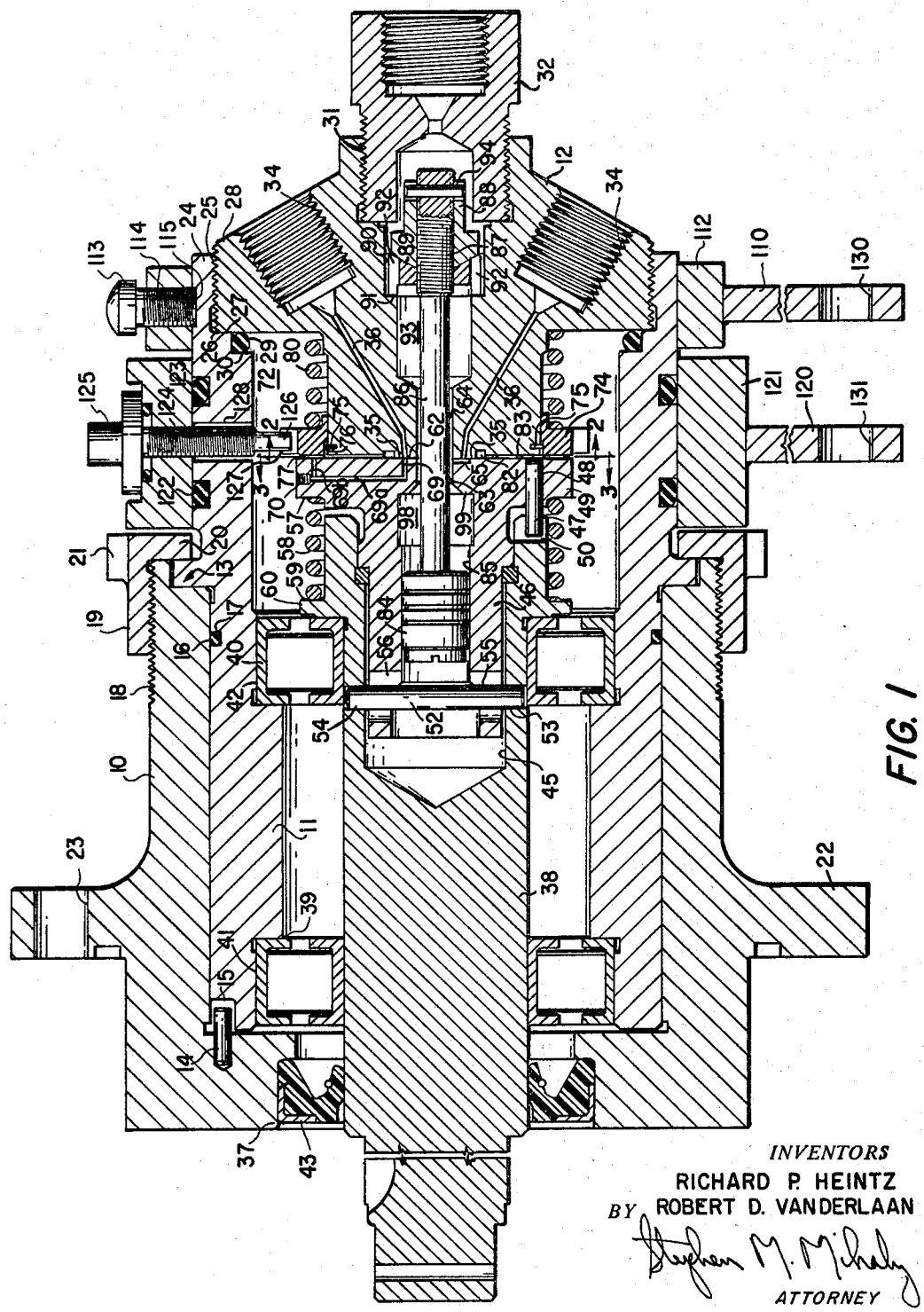
FIG. 1 is a longitudinal sectional view through the fuel control valve of the pressent invention.

Referring now in more detail to the drawings, wherein like parts have been indicated by like reference numerals, and initially to the form of the invention shown in FIGS. 1–5, the fuel control valve comprises an outer housing member 10, and inner housing sleeve 11 and a housing cap 12. The housing sleeve 11 is telescopically received within the outer housing 10 and provided with an annular flange 13 which is received in an annular recess formed in the open end of the outer housing thereby to space the housing sleeve therewithin. The sleeve 11 is arcuately keyed to the outer housing 10 by means of a pin 14 which is received in a somewhat enlarged recess 15 formed in the adjacent end of the sleeve to permit limited rotational movement of the sleeve 11 relative to the outer housing 10. An O-ring seal 16 is carried in an annular recess 17 formed in the periphery of the sleeve 11 for sealing the inner face between the sleeve and the outer housing member.

The outer housing 10 is externally threaded at its open end as indicated at 18 for receiving an internally threaded retaining ring 19, the latter being provided with an inwardly directed flange portion 20 adapted to extend over the annular flange 13 of the housing sleeve 11 thereby to removably attach the respective housing members. The retaining ring 19 includes an annular outer portion 21 suitably formed for hand or tool manipulation of the ring for facilitating such attachment. The outer housing 10 is formed with an outer flange 22 provided with a plurality of arcuately spaced openings 23, only one of which is visible in FIG. 1, for mounting the control valve on the engine.

The end 24 of the housing sleeve 11 extending outwardly of the outer housing 10 is relatively recessed and internally threaded as indicated at 25 for receiving the externally threaded housing cap 12. The sleeve 11 is formed with an annular seat or shoulder 26 against which the bottom face 27 of the radially enlarged portion 28 of the housing cap can engage for axially positioning the housing cap relative to the housing sleeve 11. An O-ring 29 is carried in recess 30 formed in the housing sleeve 11 for sealing the connection.

The outer end of the housing cap is internally threaded as indicated at 31 for receiving a fuel inlet adapter or plug 32. The plug 32 in turn is internally threaded for receiving a suitable coupling (not shown) connected to source of high-pressure fuel, for example a fuel pump. The housing cap 12 is provided with a plurality, normally six, of fuel outlet ports commonly designated at 34 which are adapted to receive suitable connections (not shown) leading to the several injector valves supplied by the fuel control valve of the present invention. Each of the outlet ports 34 of the housing cap 12 communicates with the inner end face 35 of the housing cap through an injector port or passage 36.

The outer housing 10 is formed at its bottom end with a central opening 37 for receiving shaft 38. The shaft 38 is rotatably mounted within the housing sleeve 11 by bearings 39 and 40 receivable in recesses 41 and 42, respectively, formed in the housing sleeve. A seal 43 is mounted in the opening 37 formed in the outer housing 10 for sealing the shaft in such area. The shaft 38 can be driven by any suitable means and at any suitable speed, for example at camshaft speed, for timing fuel suply to the fuel injectors.

The inner end of the shaft 38 is formed with a bore 45 for receiving a pressure plate member 46. The latter is drivingly connected to the shaft 38 through one or more drive pins 47, each of which is preferably press-fitted in an opening 48 provided therefor in a forward flange 49 of the plate member, with the opposite end of the drive pin extending into a slot 50 provided therefor in the forward end of the shaft 38. The pressure plate 46 is retained within the shaft 38 during assembly by means of a transverse pin 52 which extends through aligned openings 53 and 54 formed in the shaft 38 and opening 55 and slot 56 formed in the pressure plate 46 relatively adjacent the rear end thereof.

The above-noted flange 49 of the pressure plate 46 is adapted to receive the forward end convolution 57 of a spring 58 which functions to bias the pressure plate member uniformly into contact with the end face 35 of the housing cap 12. The opposite end convolution 59 of the spring 58 seats on an annular flange 60 formed on the shaft 38, with the opposite face of this flange engaging the bearing 40 thereby serving also to axially space the shaft 38 within the housing.

The pressure plate 46 is formed with a forward flat face 62 having a central opening 63 diametrically coextensive with a central opening 64 formed in the housing cap 12. There is formed in the face 62 around the opening 63 a groove 65 the ends 66 and 67 of which define the ends of a sealing land section 68, FIG. 3. A dump hole 69 is formed in the pressure plate 46 communicating with the forward face 62 thereof approximately arcuately centered in the sealing land section 68 thereof. The dump hole 69 communicates at its inner end with a radially directed dump passage 69a which in turn communicates with a dump passage or port 69b. The radial passage 69a is plugged as indicated at 70. As will be hereinafter described in more detail, as the pressure plate 46 rotates the sealing land section 68 will sequentially cover each of the injector ports 36; and at a certain rotative position the dump hole 69 formed in the pressure plate will be aligned with that particular injector port 36 just previously sealed off. The pressure differential which exists between the fuel pressure in that particular injector valve and port and the chamber 72 immediately outwardly of the dump slot 69b results in such pressurized fuel being drained back through the injector port 36 and dump openings 69, 69a and 69b to the chamber 72. The resulting sharp drop-off in the pressure in that particular injector valve triggers the fuel injection for that particular valve. When the shaft 38 and pressure plate 46 carried thereby have rotated so as to disalign the injector port 36 and the dump hole 69, the draining of the injector fuel will terminate, if not terminated before, with the injector port 36 being sealed by the land section 68 on the forward face 62 of the pressure plate until communication is again established between the injector port and the groove 65. Each injector valve is thus in communication with the pressurized fuel except when the sealing land section 68 is rotated to a position covering such injector port.

A dump plate 74 is telescopically mounted around the inner end of the housing cap 12 for rotation relative thereto. Pins 75 are mounted on the housing cap adjacent the inner end thereof and extend into an annular slot or recess 76 formed in the inner periphery of the dump plate, with the pins serving as axial stops for retaining the dump plate on the housing cap during assembly of the valve.

Figure 2:
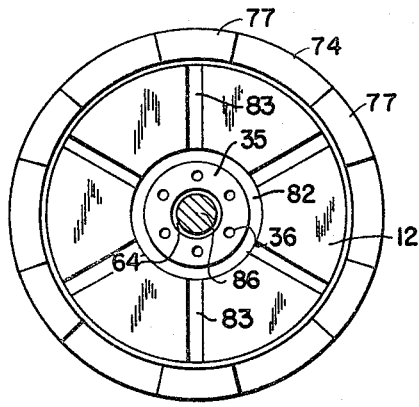
FIG. 2 is a transverse sectional view taken on line 2—2 of FIG. 1.
Figure 3:
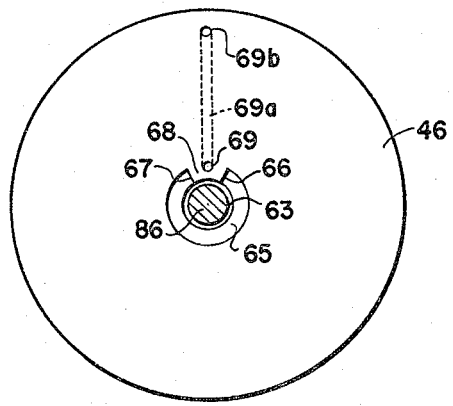
FIG. 3 is a transverse sectional view taken on line 3—3 of FIG. 1.

As best seen in FIG. 2, the dump plate 74 is formed on the inner face thereof with a series of arcuately spaced dump slots commonly designated at 77. The dump slots are six in number, corresponding to the number of injector ports formed in the housing cap. The pressure plate 46 is rotatable relative to the dump plate 74, and it will thus be seen that the dump hole 69b formed in the former will sequentially pass the several dump slots 77 during pressure plate rotation. As the dump hole 69b passes over a particular dump slot 77, the injector port 36 radially inwardly of the latter will be partially or totally in communication with the dump hole 69 whereby the pressurized fuel from the injector valve can pass back through the dump holes 69, 69a and 69b through the particular dump slot 77 to the chamber 72. In a manner forming no part of the present invention, the chamber 72 can be communicated with a suitable drain outlet leading from the valve for draining the fuel delivered to the chamber 72 to the fuel tank or the like.

A spring 80 is compressively mounted between the dump plate 74 and the housing cap 12 for biasing the dump plate into uniform contact with the front face 62 of the pressure plate.

The forward face 35 of the housing cap is formed with an annular groove 82 and a plurality of radial grooves 83 which extend radially outwardly from the groove 82 to the periphery of the housing cap in such region. The pressure tending to separate the housing cap and the pressure plate thus extends only to the inner radius of the groove 82, with any leakage reaching this area being passed to drain through the several grooves 83. By providing plate-to-plate contact with a central fuel supply, the leakage is limited to radially outward movement over one relatively small lapped area which substantially reduces leakage.

A balancing piston 84 is stationarily mounted within the bore 85 of the pressure plate member 46, with the balancing piston having a rod 86 which extends through the central openings 63 and 64 formed in the pressure plate and housing cap members, respectively, in spaced relation relative thereto. The opposite end of the rod is externally threaded as indicated at 87 for receiving a retaining nut 88, with the forward annular face 89 of such nut being spherical for seating on a complementary spherical surface of a sleeve 90 the outer periphery of which bottoms on shoulder or ledge 91 formed in the housing cap 12. The sleeve 90 is formed with spaced peripheral grooves 92 through which the pressurized fuel passes for entry into accumulating chamber 93. A pin 94 extends through aligned openings in the threaded section 87 of the balancing piston and the retaining nut 88 for preventing relative movement between the balancing piston and the retaining nut once the latter is mounted.

The balancing piston 84 and rod 86 define with the pressure plate member 46 an accumulator chamber 98 which is openly communicative with the accumulating chamber 93. The area of the shoulder 99 formed in the pressure plate 46 at the inner end of the accumulator chamber 98 is preferably slightly greater than the area of the groove 65 whereby there is a slight clamping load on the pressure plate against the housing cap serving to maintain the respective members in the desired operative position to avoid leakage, but at the same time avoid excessive frictional drag between the relatively rotatable members.

It is, as above briefly noted, highly important to be able to vary the timing and duration of the injection period, that is, the particular period or time in the rotative cycle at which the fuel is injected and the length of the injection period. As well understood by those skilled in the art, it is the duration of the injection period and the pressures within the injector valve which control the quantity of fuel delivered to the cylinder. In accordance with the present invention, the beginning or end of the injection period can be controlled in varying the duration of injection.

A duration control lever 110 is mounted on a control sleeve 112 disposed around the outer end of the housing sleeve 11. A set screw 113 is adjustable in a threaded opening 114 formed in the control sleeve 112 and is adapted to bottom in a circular recess 115 formed in the periphery of the housing sleeve for effectively mounting the clamping sleeve and lever to the housing. The housing sleeve 11 rotates freely relative to the stationary outer housing 10, by the duration control lever 110, with such rotation being relative to the dump plate 74. Alternately, the housing cap 12 can remain clamped and the dump plate rotate relative thereto by control lever 120, as will be presently described in more detail. It will be seen that relative movement, however effected, between the housing cap 12 and dump plate 74 will vary the radial alignment of any particular injector port 36 and its radially outwardly associated dump slot 77, the significance of such variable alignment being fully discussed below when particular reference is made to FIGS. 4a–4c and FIGS. 5a–5c.

The lever 120 is mounted on sleeve 121, which in turn is telescopically received around the periphery of the housing sleeve 11 and sealed relative thereto by seals 122 and 123. The sleeve 121 is formed with a threaded opening 124 for adjustably receiving a retaining screw 125. The inner end 126 of the retaining screw is relatively reduced and adapted to penetrate between adjacent peripherally extended projections 127 formed in the periphery of the dump plate member 74. In the position shown, the positioning of the inner end 126 of the retaining screw through threaded adjustment of the latter between spaced projections 127 prevents rotation of the dump plate 74. The housing sleeve 11 is formed with an enlarged arcuate opening 128 around the retaining screw 125 thereby to accommodate independent movement of the lever 120 and control sleeve 121 relative to the housing sleeve 111 thereby to rotate the dump slots 77 relative to the injector ports 36.

To change the timing of the injection cycle without affecting the duration thereof, the housing cap 12 and dump plate 74 are rotated together by levers 110 and 120 to advance or retard the supply of fuel to the respective injector ports 36. The levers 110 and 120 are preferably provided with openings 130 and 131 through which suitable adjusting means can be disposed for accurate simultaneous movement of the levers for varying the timing.

In the operation of the fuel control valve illustrated in FIGS. 1–5, fuel is admitted to the housing interior through the inlet adapter 32 and is directed to the pressure groove 65 through the accumulator chamber 93 and the annular space around the piston rod 86 and within the bore 64 of the housing cap. Rotation of the pressure plate 46 will cause each of the injector ports 36 to be sequentially pressurized, while communicating with the pressure groove 65, and sealed off from the pressurized fuel during that part of each revolution where the sealing land 68 covers the port. Owing to the relative arcuate distances of the pressure groove 65 and sealing land 68, each port 36 will be pressurized during the dominant part of each pressure plate revolution.

The fuel injection for a particular injector valve is initiated when the injector port 36 thereof communicates with the associated dump slot 77 through the dump hole 69 and dump passages 69a and 69b. At such time, owing to the substantial pressure difference between the low-pressure chamber 72 and the pressure within the injector valve and injector port 36, the pressurized fuel will drain back through the injector port 36, through the aligned dump hole 69, the dump holes 69a, 69b and dump slot 77 into the chamber 72. As the pressure plate continues to rotate, the dump hole 69 and injector port 36 will become disaligned and the injector port 36 will eventually communicate with the forward end of the pressure groove 65, with fuel under pressure again being supplied to that particular injector port and valve. In this manner, each injector port and valve is cut off from the pressurized fuel once during a full revolution of the shaft and pressure plate, with such pressure cut-off just preceding a sudden drop in pressure in the injector port and nozzle for triggering the fuel injection for that particular valve. Even at the noted high-pressure ranges of operation, the balancing piston 84 serves ot maintain the pressure plate and the housing cap in biased engagement to avoid or minimize fuel leakage along the lapped surface areas.

Figure 4A:
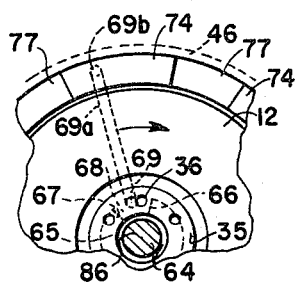
FIGS. 4a, 4b and 4c illustrate the relative rotative positions of certain of the valve components to provide an injection period having a minimum duration, with these figures being in sequence.
Figure 4B:
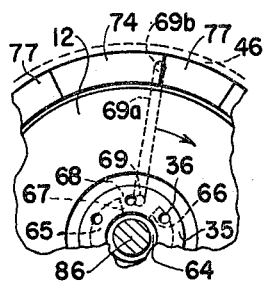
Figure 4C:
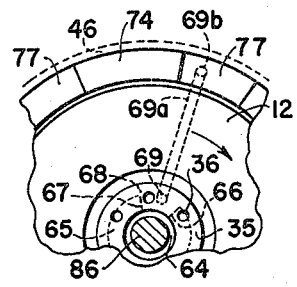

Referring now to FIGS. 4a–4c and FIGS. 5a–5c, there is illustrated therein relative rotative settings of the dump slots 77 and injector ports 36 to afford minimum and maximum, respectively, duration periods. Referring to FIG. 4a, the injector port 36 shown central and uppermost in this figure is beginning to communicate with the dump hole 69 in the pressure plate, with the latter rotating in the direction indicated by the dashed arrow. At this time, however, the dump opening 69b is traveling between dump slots 77 and thus there is no path to drain and thus no pressure drop in the injector valve. Referring to FIG. 4b, the pressure plate has now rotated to a position wherein the dump hole 69 has established communication with the dump slot 77. However, due to the relative positioning of the dump slot 77 and the central, uppermost injector port 36, the dump hole 69 has just about passed such injector port, with the result that the period of communication between the central injector port 36 and the dump slot 77 is exceedingly short thereby connecting the injector valve to drain for only a very short period of time. Since the duration of injection directly affects the amount of fuel delivered by the injector nozzle to the engine cylinder, a relatively small quantity of fuel is thus supplied by the injector nozzle. FIG. 4c shows the dump hole 69b in full communication with the slot 77 but the dump hole 69 has now been completely disaligned from the central injector 36 so as to terminate the drain of fuel from the injector valve and port to the drain chamber 72. Fuel pressurization of the uppermost injector port 36 will be re-established when the groove 65 rotates to a position in alignment therewith. It will be noted that in all the FIGS. 4a–4c, the injector ports 36 on either side of the central injector port have retained pressure communication with the pressure groove 65.

Figure 5A:
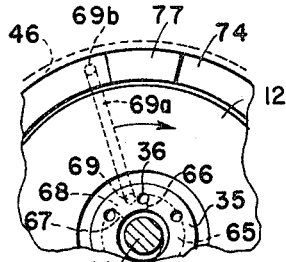
FIGS. 5a, 5b and 5c illustrate the relative positioning of the same valve components to provide an injection period of maximum duration.
Figure 5B:
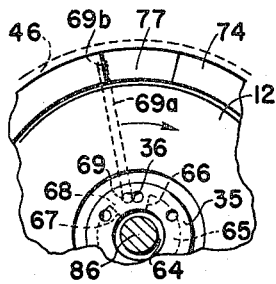
Figure 5C:
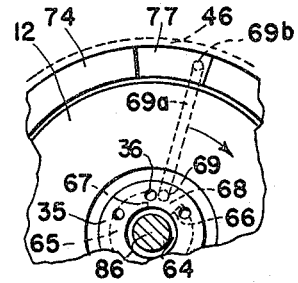

Referring to FIGS. 5a–5c, the dump plate 74 and housing cap 12 have been adjusted rotatably to afford maximum duration and thus maximum supply of fuel to the engine cylinder during the injection period. As shown in these figures, the relative adjustment has been effected through rotation of the dump plate 74 relative to the housing cap, with the dump slots being rotated counterclockwise, as shown in these figures, and the injector ports 36 thus remaining in their previous position relative to the pressure plate 46. Referring to FIG. 5a, the sealing land section 68 of the pressure plate has passed over the central, uppermost injector port 36, with the pressure plate not yet having been rotated to a position wherein the top injector port 36 communicates with the dump hole 69 or where the top dump hole 69b communicates with the dump slot 77 of the dump plate 74. Further rotation of the pressure plate, referring to FIG. 5b, will establish communication between the top injector port 36 and the dump hole 69 at about the same time as the top dump hole 69b rotates into communication with the dump slot 77. The entire time the dump hole 69 is in communication with the top injector hole 36, the top dump hole 69b is in flow communication with the dump slot 77, whereby the drain of fuel back through the injection port 36 to drain is the maximum permitted by the size of the injection port and dump slot, and repressurization of the port 36 by the pressure groove 65, which terminates the injection cycle, is deferred the maximum degree. This duration setting permits maximum fuel delivery by the injection valve to the engine cylinder.

It should be noted that by achieving duration control through movement of the dump plate, as described above in reference to FIGS. 5a–5c, the beginning of the injection period is varied to effect the change in duration, with the end of the injection period, which occurs when the injector port 36 again communicates with the pressure groove 65 of the pressure plate, remaining the same. By rotating the dump plate 74 counterclockwise to its FIGS. 5a–5c position, the dump hole 69b communicates relatively sooner with the dump slot 77 thereby to initiate the injection period sooner, when compared with the FIGS. 4a–4c position of the dump plate. The end of the injection period in both of the adjusted positions of the dump plate remains the same since the relative positions of the pressure plate and housing cap 12 have not been changed.

As above noted, the duration of injection can alternately be controlled by movement of the housing cap 12 relative to the dump plate 74. This will not affect the beginning of the injection cycle inasmuch as the dump slots remain in their same position, but the end of the injection cycle is varied inasmuch as the injector ports have been rotated relative to the pressure groove 65. As a result, repressurization of the injector ports 36 is established relatively sooner or later, depending upon the direction of rotation of the housing cap 12 by the control lever 110.

It will be well understood by those skilled in the art that it may be more desirable to achieve duration control by varying the end of the injection period, rather than the beginning. For example, to obtain optimum fuel combustion in the engine cylinder, the beginning of the injection cycle is relatively more important and is desirably fixed once timing is adjusted. Thus, to obtain duration control in this particular environment, the housing cap 12 can be adjusted, which will, as described, control the end of the injection cycle. In other use environments of the valve, however, it may be of advantage to vary the beginning of injection, rather than the end, and the dump plate can be selectively adjusted in such event. Thus, the invention provides important flexibility in use.

It will be understood that the housing sleeve 11 and the dump plate 74 can be relatively rotated to provide numerous positions of adjustment between the maximum and minimum duration adjustments illustrated and above described. The quantity of fuel injected during each cycle can thus be quickly and accurately controlled through simple lever manipulation. To advance or retard the timing, both levers 110 and 120 are rotated thereby leaving the dump plate and injector port openings 36 in their previous adjusted positions. It should also be noted that the duration period is not singly controlled or limited by the dump slot width or the arcuate distance of the sealing land, with variable adjustment being provided to afford very short or relatively long duration periods to be realized.

It will thus be seen that the control valve shown in FIGS. 1–5 is advantageous in several respects when compared with present valves of this general type. The plate-to-plate arrangement greatly minimizes the precise machining required and thus reduces manufacturing costs. Further, the leakage is substantially reduced through the provision of a balancing piston which counteracts the pressure in the pressure groove tending to separate the housing cap and the pressure plate. Duration control means are provided for varying the duration of the injection period selectively at the beginning or end thereof, as well as varying the injection timing.

Figure 6:
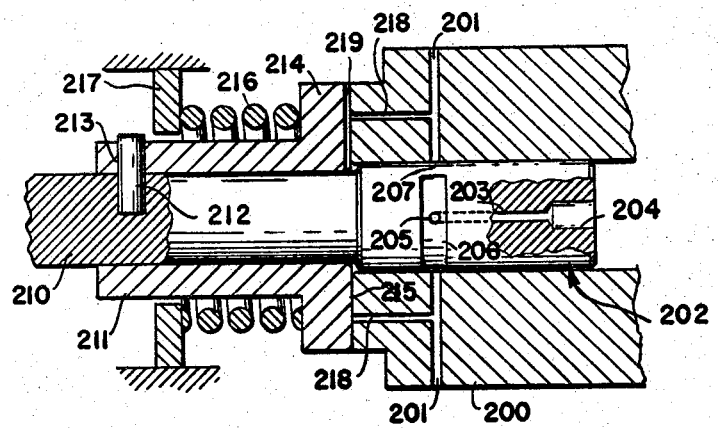
FIG. 6 is a partially schematic sectional view of a modified form of control valve.
Figure 7:
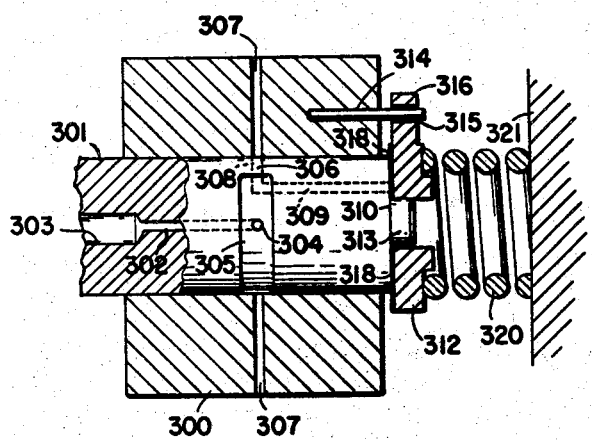
FIG. 7 is a partially schematic, sectional view of a further modified form of control valve.

FIGS. 6 and 7 illustrate, partially schematically, control valves of slightly modified construction. Referring initially to the FIG. 6 form, a housing cap 200 is provided with a plurality of arcuately spaced, radial injector ports commonly designated at 201 which are communicative, in the manner previously described, with injector valves supplied by the control valve. Fuel under pressure is supplied sequentially to the several injector ports 201 by a spool generally indicated at 202. An axial, central opening 203 is formed in the spool, with the same being relatively enlarged at the outer end thereof as indicated at 204 for receiving suitable coupling means connected to a suitable source of high-pressure fuel, for example a high-pressure pump.

A transverse opening 205 is formed in the spool in communication with the forward end of the axial opening 203, with the radially outer ends of the opening 205 communicating with a pressure groove 206 formed in the periphery of the spool 202. The groove 206 may correspond generally in arcuate length to the length of the pressure groove 65 in the FIGS. 1–5 valve form, or may, if desired, comprise two separate groove sections, each supplied by the opening 205. In the form shown, the ends of the pressure groove 206 define the ends of a sealing land 207 which functions to sequentially shut off each of the injector ports 201 to the pressurized fuel in the same manner as described above.

The opposite end 210 of the spool 202 can be rotatably driven in any suitable manner forming no part of the present invention, and a dump plate 211 is journaled on the spool 202 at this end. The dump plate 211 is carried by the spool 202 by means of a pin 212 which is preferably press fitted in an opening formed in the spool and extends into a slot 213 formed in the body of the pressure plate 211. The slot 213 is arcuately elongated to provide for relative rotation of the dump plate and the spool to change the duration of the injection cycle, as will be hereinafter described.

The dump plate 211 is formed with a forward annular flange 214 adapted to engage the forward face 215 of the housing cap 200. A spring 216 is interposed between the flange 214 and a housing section 217 for biasing the dump plate into uniform engagement with the face 215 of the housing.

The housing cap 200 is formed with a plurality of dump holes commonly designated at 218 equal in number to and communicating with the injector ports 201, with the opposite ends of such dump holes communicating with the face 215 of the housing cap. The dump plate 211 is formed with a single dump slot 219 generally corresponding in arcuate dimension to the dump slot 77 in the above-described valve form. The dump slot 219 functions to sequentially intercommunicate each of the injector ports 201 to the area of low pressure immediately outwardly of the dump plate for dropping the pressure in the injector valve and triggering the injection cycle.

As above briefly noted, the dump plate 211 is journaled on the spool 202 for rotation relative thereto thereby to vary the duration of the injection cycle, that is, the time during which the several injector ports 201 are sequentially at low pressure. By manipulating the dump plate 211 relative to the spool, the duration control is achieved by changing the beginning of the duration period, being similar in this regard to the adjustment of the dump plate in the above-described FIGS. 1–5 form. Alternatively, the spool 202 can be adjusted relative to the dump plate to provide the same change in duration, but with the end of the duration period being controlled in this instance. In other words, the pressure groove 206 will communicate with the several injector ports relatively sooner or relatively later thereby to change the repressurization which terminates the injection period.

The operation of the valve form illustrated in FIG. 6 should be apparent from the above description. Fuel at relatively high pressures enters the spool through the axial opening 203 and is delivered to the pressure groove 206 which sequentially feeds the several injector ports 201. As the sealing land 207 passes each injector port during rotation of the spool, that particular port, the top injector port 201 as shown in FIG. 6, will be cut off from the pressurized fuel. Substantially simultaneously, the dump slot 219 will communicate with the dump hole 218 associated with the top injector port 201, with the latter thereby communicating with the area of low pressure outwardly of the dump plate. Communicating the port 201 to low pressure triggers the injection cycle, with the duration of such injection being controlled by the relative rotative positions of the valve spool 202 and the dump plate 211. The duration control can be effected by changing the end or beginning of the injection as above noted. To change the timing in the FIG. 6 valve form, the housing cap 200 can be rotated relative both to the spool and the dump plate, or vice versa, which merely advances or rewards the injection for the several injector valves without, however, affecting the duration of each such injection. The spring 216 serves to clamp the dump plate against the end of the housing during relative rotation therebetween thereby serving to overcome the relatively high pressures existing in the several dump holes 218.

Referring to the FIG. 7 valve form, which is similarly partially schematically shown, a cylindrical housing 300 is adapted to rotatably receive spool 301 which can be rotatably driven in the manner perviously described. The spool is axially bored as indicated at 302 for receiving pressurized fuel through the enlarged inlet end 303. A transverse slot 304 communicates with the inner end of the axial opening 302, with the opening communicating at the opposite end thereof with a groove 305 formed in the periphery of the spool 301. The groove 305 may be continuous as described in the FIGS. 1–5 form, or may comprise two individual arcuate sections. A sealing land 306 defines the ends of the pressure groove 305 and effectively seals off the several injector ports 307 formed in the housing 300 during rotation of the spool 301 in the same manner described above in the FIG. 6 form.

A dump hole 308 is formed in the spool 301 approximately arcuately intermediate the ends of the sealing land 306, with the dump hole 308 extending radially inwardly and including a forward directed portion 309 parallel to the axis of the spool, the dump hole portion 309 communicating with the end face 310 of the spool 301.

A dump plate 312 is journaled on the forward, reduced end 313 of the spool and is pinned to the housing 300 through a pin 314 which is preferably press fit in the housing 300 and extends into a slot 315 formed in flange 316 of the dump plate. The slot 315 is relatively arcuately elongated thereby to afford rotation of the dump plate 312 relative to the housing 300 to provide for duration control of the injection period.

The dump plate 312 is formed with a plurality of arcuately spaced dump slots commonly designated at 318 equal in number and arcuate spacing to the several injector ports 307. Each slot 318 is slightly wider than the diameter of the dump holes 308, 309. The area surrounding the dump plate 312 is of relatively low pressure whereby the several injector ports 307 are connected to drain through the respective dump slots 318 upon rotation of the spool 301. The spring 320 is interposed between the dump plate 312 and a housing section 321 for biasing the dump plate into engagement with the leading face 310 of the spool, with such biasing functioning to counteract the relatively high pressures acting in the opposite direction through the dump holes 308, 309.

The operation of the FIG. 7 valve form is as follows. Fuel at relatively high pressure enters the spool through the axial inlet 302 and is directed to the several injector ports 307 through the pressure groove 305. The injector ports are each communicative with an injector valve thereby to supply high-pressure fuel thereto during the dominant part of the spool revolution. As the sealing land 306 passes over each injector port 307 during the spool revolution, for example the top injector port 307 as shown in FIG. 7, the pressure is cut off to such port, and further rotation of the spool establishes communication between such port and the dump holes 308, 309. Owing to the relatively great pressure differences between the interior of the injector valve and the area outwardly of the dump plate 312, the fuel will be dumped or drained backwardly through the injector port 307 and dump holes 308, 309 to the associated dump slot 318 formed in the dump plate. The fuel will continue to drain as long as the dump hole 308 is communicative with the injector port 307 and the dump slot 318 is communicative with the dump hole portion 309 or until reduced to return pressure. Continued rotation of the spool 301 will re-establish communication between the top injector port 307 and the pressure groove 305 at which time the injector valve associated with the top injector port 307 is again supplied with pressurized fuel to condition the valve for the following injection. In this manner, the dump holes 308, 309 during each revolution of the spool 301 intercommunicate the several injector ports 307 and their associated dump slots 318 to trigger the injection of the several injector valves supplied by each injector port.

The duration of the injection period is controlled by relative rotation of the dump plate 312 and the housing 300. In the same manner as previously described, rotation of the dump plate 312 to change the relative position of the dump slots 318 with respect to the dump hole 309 serves to control the duration of the injection period by controlling the beginning of injection. Alternately, rotation of the housing 300 relative to the dump plate 312 will vary the duration through controlling the end of the injection period by relatively advancing or retarding the repressurization of each injector port by the pressure groove 305. To control the timing of the injection period, both the dump plate 312 and the housing 300 are rotated relative to the spool 301.

It will thus be seen that the FIGS. 6 and 7 valve forms similarly advantageously provide a dump plate which contributes to reduced valve costs and minimizes fuel leakage. The duration of the injection period can be readily controlled either at the beginning or the end of the injection period to afford the desired operation.

Although the disclosed valve forms find particularly advantageous use in fuel injection systems, it will be understood that the invention principles contemplate other use environments as well.

Other modes of applying the principle of the invention may be employed, change being made as regards the details described, provided the features stated in any of the following claims or the equivalent of such be employed.

We therefore particularly point out and distinctly claim as our invention:

1. A fluid control valve comprising housing means having an inlet and a plurality of outlet passages, plate means rotatably mounted in said housing means in biased engagement with a section of said housing means, means for rotating said plate means, said plate means being formed with means for sequentially intercommunicating said inlet and said outlet passages for delivering fluid to the latter, dump means mounted in said housing means and communicating with an area of low pressure, said plate means and said dump means being formed with sequentially communicating passages adapted to connect each of said outlet passages sequentially to said area of low pressure responsive to rotation of said plate means.

2. The combination of claim 1 wherein said means formed in said plate means for intercommunicating said inlet and said outlet passages comprises an arcuate groove, the opposed ends of which define the ends of a sealing land adapted to sequentially cover said outlet passages for temporarily isolating the same from pressurized fluid.

3. A fuel control valve comprising housing means having a fuel inlet and a plurality of fuel outlet passages, a pressure plate rotatably mounted in said housing means and in biased engagement with a generally flat surface of said housing means, said pressure plate being formed with means for sequentially intercommunicating said inlet and said fuel outlet passages for delivering fuel to the latter, a dump plate mounted in said housing means and communicating with a drain area of low pressure, said pressure plate and said dump plate being formed with sequentially communicating passages adapted to connect each of said fuel outlet passages sequentially to drain.

4. The combination of claim 3 wherein said means formed in said pressure plate for intercommunicating said inlet and said fuel outlet passages comprises an arcuate groove the opposed ends of which define the ends of a sealing land adapted to sequentially cover said outlet passages for temporarily isolating the same from pressurized fuel.

5. The combination of claim 4 wherein said passage formed in said pressure plate for sequentially communicating said fuel outlet passages to drain includes a generally coaxial dump opening formed in said sealing land of said pressure plate approximately intermediate the ends thereof, said dump hole connecting each of said outlet passages sequentially to drain.

6. The combination of claim 3 further including means for producing relative rotation between said housing means and said dump plate to vary the radial relation of said fuel outlet passages formed in said housing means and said passages formed in said dump plate.

7. The combustion of claim 3 further including means for rotating said housing means and said dump plate relative to said pressure plate for varying the timing of fuel delivery to said outlet passages.

8. A fuel control valve comprising housing means having a fuel inlet and a plurality of fuel outlet passages, pressure plate means rotatably mounted in said housing means, means for biasing said pressure plate means into engagement with an adjacent face of said housing means, said pressure plate means being formed with means for sequentially intercommunicating said fuel inlet and fuel outlet passages for delivering fuel to the latter, and a dump plate mounted in said housing, said dump plate and said pressure plate means being formed with sequentially communicating passages adapted to connect each of said fuel outlet passages sequentially to drain.

9. The combination of claim 8 wherein said biasing means comprises a balancing piston mounted within said pressure plate means and defining therewith an accumulating chamber for receiving pressurized fuel, such pressurized fuel urging said pressure plate means into engagement with said adjacent face of said housing means.

10. The combination of claim 8 further including means for resiliently biasing said dump plate into engagement with said pressure plate means.

11. A fuel control valve comprising housing means including a housing sleeve and a housing cap mounted on said sleeve, said housing cap having formed therein a central fuel inlet and a plurality of fuel outlet passages, pressure plate means rotatably mounted in said housing means, means for rotating said pressure plate means, means for biasing said pressure plate means into engagement with an adjacent, generally flat end of said housing cap, said pressure plate means being formed with a pressure groove for sequentially intercommunicating said inlet and said fuel outlet passages formed in said housing cap for delivering fuel to such passages, dump plate means mounted around said adjacent end of said housing cap, said dump plate being formed with a plurality of arcuately spaced dump slots which communicate radially outwardly with an area of low pressure, said pressure plate means being formed with dump passage means for sequentially communicating each of said fuel outlet passages with a respecttive dump slot for connecting such outlet passage to said area of low pressure.

12. The combination of claim 11 further including means for producing relative rotation between said housing cap and said dump plate to vary the radial relation of said fuel outlet passages and said dump slots thereby to vary the time during which each of said outlet passages is at low pressure.

13. The combination of claim 11 further including means for rotating said dump plate and said housing cap relative to said pressure plate means for varying the timing of fuel delivery to said outlet passages.

14. The combination of claim 11 further including a balancing piston mounted in said pressure plate means and defining therewith an accumulating chamber for receiving pressurized fuel, such pressurized fuel urging said pressure plate means into engagement with said flat end of said housing cap.

15. A fuel control valve comprising housing means including a housing cap having a central fuel inlet and a plurality of radially outwardly spaced fuel outlet passages, a pressure plate mounted for rotation in said housing means in biased engagement with an adjacent, generally flat end of said housing cap, said central inlet and said outlet passages communicating with said flat end of said cap, said pressure plate means being formed with an arcuate groove means for sequentially intercommunicating said central inlet and said fuel outlet passages for delivering fuel to the latter, dump plate means mounted around said end of said housing cap and having a plurality of arcuately spaced dump slots generally radially outwardly of said outlet passages communicating with an area of relatively low pressure, said pressure plate being further formed with dump passage means sequentially communicating each of said fuel outlet passages with an associated dump slot in said dump plate for reducing the pressure in such outlet passage.

16. A fuel control valve comprising housing means, injector port openings formed in said housing means for receiving pressurized fuel, means including first plate means mounted in said housing for supplying pressurized fuel to said port openings, second plate means mounted in said housing having dump slot means communicative with an area of relatively low pressure, and means for sequentially establishing communication between said injector port openings and said dump slot means for sequentially dropping the pressure in each such opening for initiating the fuel injection cycle.

17. The combination of claim 16 further including means for producing relative rotation between said second plate means and said housing for varying the communication between said injector port openings and said dump slot means thereby varying the duration of the injection period.

18. A fuel control valve comprising housing means, injector port openings formed in said housing means for receiving pressurized fuel, spool means rotatably mounted in said housing and provided with an arcuate groove at the periphery thereof for supplying pressurized fuel to said port openings, dump plate means journaled on said spool means and rotatably carried thereby, means for biasing said dump plate means into engagement with an end face of said housing means, said dump plate means having a dump slot communicative with an area of relatively low pressure, said housing means being formed with a plurality of dump holes each of which is communicative with an injector port, said dump slot of said dump plate during rotation of the latter sequentially communicating with each of said injector port openings through said dump holes for dropping the pressure in each such opening for initiating the fuel injection cycle.

19. The valve of claim 18 further including means for relatively rotating said dump plate means and said spool for varying the communication between said dump slot and said dump holes thereby to vary the duration of the injection period.

20. A fuel control valve comprising housing means, injector port openings formed in said housing means for receiving pressurized fuel, spool means rotatably mounted in said housing and provided with an arcuate groove at the periphery thereof for supplying pressurized fuel to said injector port openings, a dump plate mounted on said housing means and non-rotatably journaled on said spool, said dump plate having a plurality of arcuately spaced dump slots communicative with an area of relatively low pressure, said spool being formed with dump hole means sequentially communicating each of said injector ports with an associated dump slot during rotation of said spool means for dropping the pressure in each such opening for initiating the fuel injection cycle.

21. The valve of claim 20 further including means for relatively rotating said dump plate means and said housing means to vary the communication between said injector port openings and said dump slots thereby to vary the duration of the injection period.

No references cited.

M. CARY NELSON, *Primary Examiner.*

W. CLINE, *Assistant Examiner.*